June 13, 1944.  O. J. POUPITCH  2,351,065
FASTENER DEVICE
Filed Feb. 26, 1943
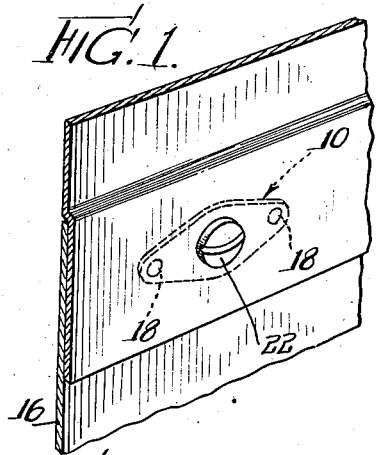
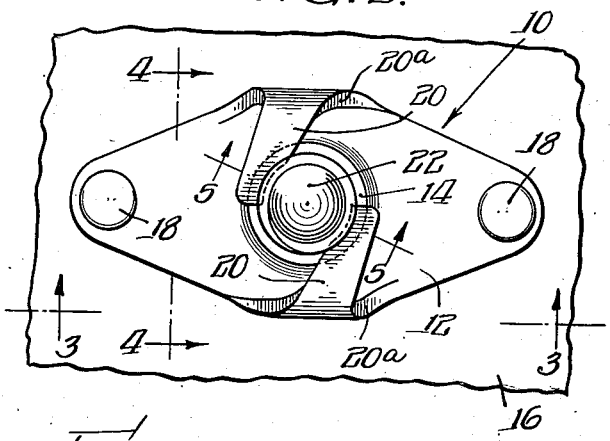
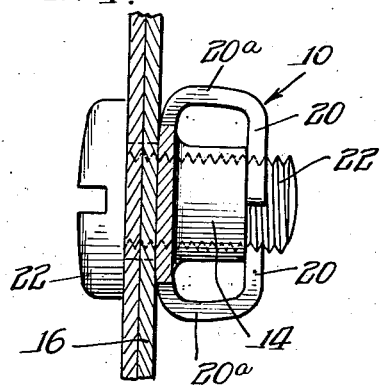
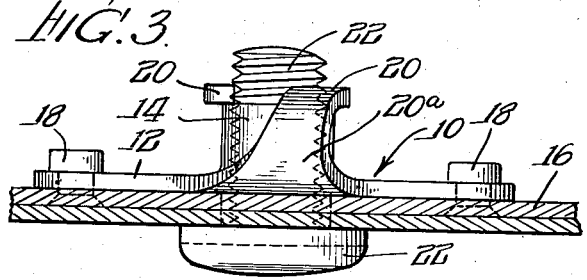
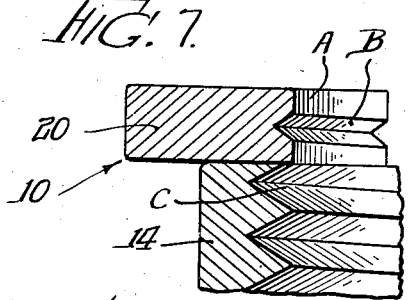
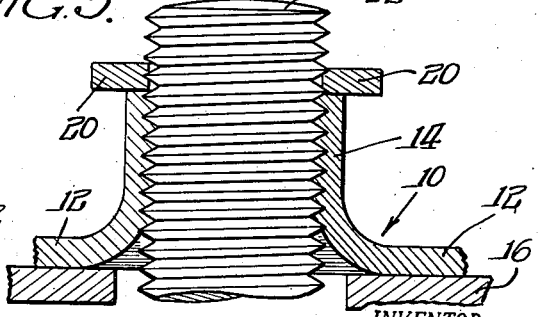
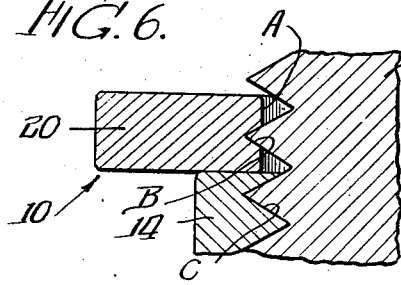
INVENTOR.
Ougljesa Jules Poupitch
By: Loftus, Moore, Olson & Trexler
attys.

Patented June 13, 1944

2,351,065

UNITED STATES PATENT OFFICE 2,351,065

FASTENER DEVICE

Ougljesa Jules Poupitch, Chicago, Ill., assignor to Illinois Tool Works, Chicago, Ill., a corporation of Illinois Application February 26, 1943, Serial No. 477,186

12 Claims. (Cl. 151—25)

This invention relates generally to fastener devices and more particularly to fastener devices for securing sheet metal parts together.

The present invention is primarily concerned with the provision of fastening devices of extremely simple yet durable construction, capable of being very economically produced. To this end the invention contemplates a fastener device which may be stamped from sheet metal stock and which is adapted to cooperate with a conventional screw member in lockingly securing parts together.

More specifically the present invention contemplates a fastener device as set forth above which is equipped with efficiently operable means for securing an associated screw member against inadvertent or unauthorized loosening.

The present invention proposes to overcome problems which have heretofore been experienced in the use of certain conventional screw locking devices. For example, certain industries, such as the aircraft industry, require fasteners which are extremely light in weight and yet capable of satisfactorily withstanding the severest conditions of vibration and other forces incident to the use of aircraft. Inasmuch as the present invention contemplates a fastener which may be economically stamped and formed from sheet metal stock, the problem of weight is satisfactorily met.

Another problem which the fastener device of the present invention has very effectively overcome is that of permitting repeated attachment and detachment without in the slightest degree impairing the locking effectiveness of the fastener. To this end the invention contemplates a sheet metal fastener having in combination with a substantial screw thread holding section, resilient metallic means of novel design for frictionally resisting relative rotation between the sheet metal fastener and screw member associated therewith.

By having the fastener constructed entirely of metal, its locking effectiveness is unaffected by variations in temperature, the presence of a lubricant, or in instances where moist and dry conditions are alternately experienced.

Still more specifically, the present invention contemplates a fastener device as set forth above which in one form may be conveniently secured to a work piece such as a metallic sheet.

The foregoing and other objects and advantages will be apparent from the following detailed description when considered in connection with the accompanying drawing, wherein:

Fig. 1 is a perspective view showing the manner in which two metallic sheets may be secured together by a fastener of the type contemplated by the present invention;

Fig. 2 is an enlarged elevational view of the rear side of the plates shown in Fig. 1 to more clearly illustrate the structural characteristics of the sheet metal fastener contemplated by the present invention;

Fig. 3 is a side elevational view of the fastener taken substantially along the line 3—3 of Fig. 2;

Fig. 4 is a sectional view taken substantially along the line 4—4 of Fig. 2;

Fig. 5 is an enlarged fragmentary sectional view taken substantially along the line 5—5 of Fig. 2 disclosing the position occupied by the screw locking arms of the sheet metal fastener when a screw member is associated therewith;

Fig. 6 is an enlarged sectional view of the screw locking arms and structures in the vicinity thereof similar to the disclosure in Fig. 5, said view being shown to more clearly illustrate the manner in which the arm frictionally engages a complementary thread convolution of the screw;

Fig. 7 is a view similar to Fig. 6 showing the inwardly sprung position occupied by the screw locking arm when the screw member is not in association therewith; and Fig. 8 is a view similar to Fig. 3 disclosing a slightly modified form of fastener wherein the central portion is slightly sprung away from the work surface.

Referring now to the drawing more in detail wherein like numerals have been employed to designate similar parts throughout the various figures, it will be seen that the invention contemplates a fastener device designated generally by the numeral 10 (Figs. 1 to 7, inclusive). This fastener device 10 is preferably stamped and formed from sheet metal stock and includes a base section 12 and a central internally threaded section 14 extending laterally of the base section or plate 12. In the disclosed embodiment this internally threaded laterally extending section 14 is formed integral with the base section 12. The base section 12 is adapted to be secured to a work piece or plate 16 by means of suitable fastening elements or rivets 18 which extend through complementary apertures in the base section and work piece.

The material of the base section 12 is provided with extensions on opposite sides thereof in the form of resilient locking members or arms 20. These arms 20 are preferably narrower at their free extremities than at the portions 20a which connect with the base section 12. The arms 20 extend in substantial parallelism with the plane of the base 12 and lie immediately adjacent in superimposing relation to the outer edge of the internally threaded section 14.

In the production of the fastener 10 the laterally extending section 14 is first extruded and the arms 20 then bent inwardly to the position shown. It will be noted that inner portions A of the arms 20 are arcuate to conform with the circular periphery of a screw member 22. Before a thread is tapped within the extruded section 14 the arcuate surfaces A of the arms 20 occupy the position shown in Fig. 7. As a tap is introduced within the cylindrical section 14 from a point oppositely disposed from the arms 20, the thread convolutions are formed within the section 14 and ultimately the tap reaches the resilient arms 20. As the cutting edges of the tap initially engage the arcuate surfaces A there will be a tendency for the arms 20 to spring radially outward. As a result the thread convolutions B cut in the arms 20 will be shallower than the thread convolutions C formed in the cylindrical section 14. After the tapping operation has been completed and before the tap has been removed the arms 20 will occupy the position shown in Fig. 6. When the tap is removed the arms 20 will automatically spring back to their normal initial position as illustrated in Fig. 7.

From the foregoing it will be apparent that when the screw member 22 is turned within the extruded section 14 and brought into engagement with the arms 20, said arms will be shifted radially outward as an incident to the movement of the screw. This shifting of the arms 20 produces a marked increase in frictional resistance and serves to lockingly secure the parts against inadvertent or unauthorized loosening. As the screw is finally tightened to the position shown in Figs. 3 and 4 any tendency to urge the arms toward the base section is counteracted by the outer edge of the section 14.

It will be apparent from the foregoing that the frictional engagement between the arms 20 and the screw 22 provides an effective resilient lock. The resilient arms or members 20 are provided with arcuate thread engaging sections, as clearly disclosed in Figs. 2 and 7, and these arcuate sections are normally eccentric with respect to the internally threaded section 14. In other words, the introduction of the screw 22 serves to concentrically position the aforesaid arcuate sections, thereby causing the arms to swing through an arc which amounts to substantially radial movement at the point of locking contact. By employing the edge portions of the arms 20 for lockingly engaging the screw thread, a frictional thread contacting surface of substantial length is made possible. It will also be apparent that the aforesaid outward radial shifting of the arms in the vicinity of thread engagement takes place as an incident to the engagement therewith of the complementary screw member during relative rotation between the screw member and internally threaded section. That is to say, the arms 20 are rendered lockingly effective immediately upon engaging the thread convolutions of the screw member, and hence do not depend for their locking effectiveness upon the final tightening of the screw within the fastener.

The normal diameter which is defined by the arcuate surfaces A of the arms 20 is preferably not less than the root diameter of the screw thread. Should the arcuate surfaces A appreciably overhang the minimum diameter of the thread convolutions in the member 14, there would be a tendency for the arms 20 to be sprung upwardly upon the engagement therewith of the advancing extremity of the screw member. By having the aforesaid diameter arranged as disclosed the thread convolutions of the screw will move from the member 14 into the shallower thread B of the arms 20 without axially displacing the arms and hence without any tendency to mar or disfigure thread convolutions.

It will also be noted that the tangential arrangement of the arms and particularly the screw engaging edge of the arms is such as to positively preclude disfigurement or wearing of the thread in the screw. By having the arms positioned in a plane spaced from and substantially parallel with the base section a very firm resilient grip on the screw threads is obtained. The outward flexing of the arms 20 is opposed by the sections 20a, said sections 20a providing a strong torsional resistance to forces resulting from the engagement of the screw thread with the complementary shallow thread convolution in the arms. In a fastener of the type described herein, there is no tendency for metal fatigue or wear and hence a screw may be repeatedly attached and detached with respect to the fastener without in any degree impairing the locking effectiveness thereof.

In Fig. 8 a slightly modified form of fastener is shown which I have designated generally by the numeral 10a. The only structural difference between the fastener 10a and the fastener 10 is that the fastener 10a is slightly sprung outwardly at its central portion, as indicated in Fig. 8. Thus, when the fastener is finally tightened to the position shown in Fig. 3 the central portion will be flexed against the work surface, thereby setting up increased frictional resistance between the thread convolutions of the section 14 and the complementary thread convolutions of the screw 22. When the central portion of the fastener is flexed as indicated in Fig. 8, it is preferable to provide clearance for the rivets 18 in the base section 12. In the device shown in Figs. 1 to 7, inclusive, the rivets are not subjected to any transverse strains as a result of the tightening of the screw within the fastener. Hence no clearance for the rivets, of the nature indicated in Fig. 8, is required.

It will also be apparent from the foregoing description that the fastener contemplated by the present invention is extremely light in construction in that it may be formed completely from sheet metal stock. Also, the invention is not necessarily limited to a fastener adapted to be secured to a work piece but is capable of incorporating base sections varying in shape to meet the particular needs incident to its use. As previously pointed out, the structural characteristics of the fastener are unaffected by temperature variations and the like. For example, the present fastener lends itself for use in association with internal combustion engines and the like wherein wide variations in temperature are experienced. By having the device constructed entirely of sheet metal, properly hardened and tempered, wide variations in temperature may be experienced without in any way impairing the locking characteristics of the fastener. The fasteners of the present invention are particularly adaptable in the construction of aircraft, not only because of their lightness in weight but also because their locking effectiveness remains unimpaired when subjected to the most severe variations in weather conditions.

Obviously the invention is not limited to the specific structural details disclosed herein but is capable of other modifications and changes without departing from the spirit and scope of the appended claims.

The invention is hereby claimed as follows:

1. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a resilient thread engaging arm supported by and superimposing the base section, said arm having a free extremity presenting a circumferential thread gripping surface adapted to slidably resist screw rotation in opposite directions, said circumferential surface being shiftable radially outward about an axis extending transversely of said base as an incident to the engagement therewith of a complementary screw member during relative rotation between said internal helix and said screw member whereby to increase frictional locking resistance between said resilient arm and screw thread.

2. A fastener as set forth in claim 1, wherein the screw receiving section comprises an internally threaded member extending laterally of the base section.

3. A fastener as set forth in claim 1, wherein the screw receiving section comprises an internally threaded member extending laterally of the base section and presenting an abutment to limit flexing of the thread engaging arm toward the plane of the base section.

4. A fastener device including a sheet metal base section adapted to be secured to a member to be fastened, a screw receiving section non-rotatable with respect to said base section and having an internal screw accommodating helix, and locking means for frictionally engaging the thread of a screw member complementary to and projecting axially beyond the helix of said screw receiving section, said locking means including a resilient thread engaging arm supported by and superimposing the base section, said arm having a free extremity presenting a circumferential thread gripping surface adapted to slidably resist screw rotation in opposite directions, said circumferential surface being shiftable radially outward about an axis extending transversely of the base as an incident to the engagement therewith of a complementary screw member during the turning of said screw member within said internal helix whereby to increase frictional locking resistance between said resilient arm and screw thread.

5. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a pair of oppositely disposed resilient thread engaging arms supported by and superimposing the base section, each of said arms having a free extremity presenting a circumferential thread gripping surface adapted to slidably resist screw rotation in opposite directions, said circumferential surface being shiftable radially outward about an axis extending transversely of the base as an incident to the engagement therewith of a complementary screw member during relative rotation between said internal helix and said screw member whereby to increase frictional locking resistance between said resilient arms and screw thread.

6. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a resilient sheet metal thread engaging arm positioned in a plane spaced from and substantially parallel with said base section, a side edge portion of said arm positioned in the path of movement of a screw complementary to said internal helix and shiftable radially outward when engaged by said screw member to increase frictional locking resistance between said resilient arm and screw thread.

7. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a resilient thread engaging arm supported by the base section, said arm comprising a lateral extension of the side margin of said base and a portion bent into adjacent superimposing relation with respect to said screw receiving section of the base about an axis substantially parallel with the plane of said base, the thread engaging portion of said arm being shiftable radially outward as an incident to relative rotation between said internal helix and complementary screw member whereby to increase frictional locking resistance between said resilient arm and screw thread.

8. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a resilient thread engaging arm supported by the base section, said arm extending tangentially with respect to the complementary screw member engaged thereby and having a thread engaging surface of substantial arcuate extent normally positioned radially of the axis of said screw member a distance which is less than the maximum radius of said screw whereby the engagement of the thread of the screw member with said arm will cause said arm to shift radially outward and thus increase frictional locking resistance between the arm and screw thread.

9. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a resilient member formed integral with the base section, said resilient member including a portion bent outwardly to provide a lateral extension of the side margin of the base, the outer extremity of said lateral extension being bent into adjacent superimposing relation with respect to said screw receiving section and presenting an arcuate thread engaging section which is normally positioned inwardly with respect to the maximum diameter of said internal helix, whereby when said complementary screw member and helix are relatively rotated the thread of said screw member will engage said arcuate section and cause it to move radially outward into a position of concentricity with respect to said screw.

10. A fastener device as set forth in claim 9 wherein the arcuate thread engaging section presents a thread engaging surface of substantial circumferential extent.

11. A fastener device as set forth in claim 9 wherein the screw receiving section comprises an internally threaded member formed integral with and extending laterally of the base section.

12. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a plurality of oppositely disposed members formed integral with the base section, said resilient members including portions bent outwardly to provide oppositely disposed lateral extensions of the side margins of the base, the outer extremity of said lateral extensions being bent into adjacent superimposing relation with respect to said screw receiving section and presenting opposed arcuate thread engaging sections which are normally positioned inwardly with respect to the maximum diameter of said internal helix, whereby when said complementary screw member and helix are relatively rotated the thread of said screw member will engage said arcuate sections and cause them to move radially outward into a position of concentricity with respect to said screw.

OUGLJESA JULES POUPITCH.